Figure 1:
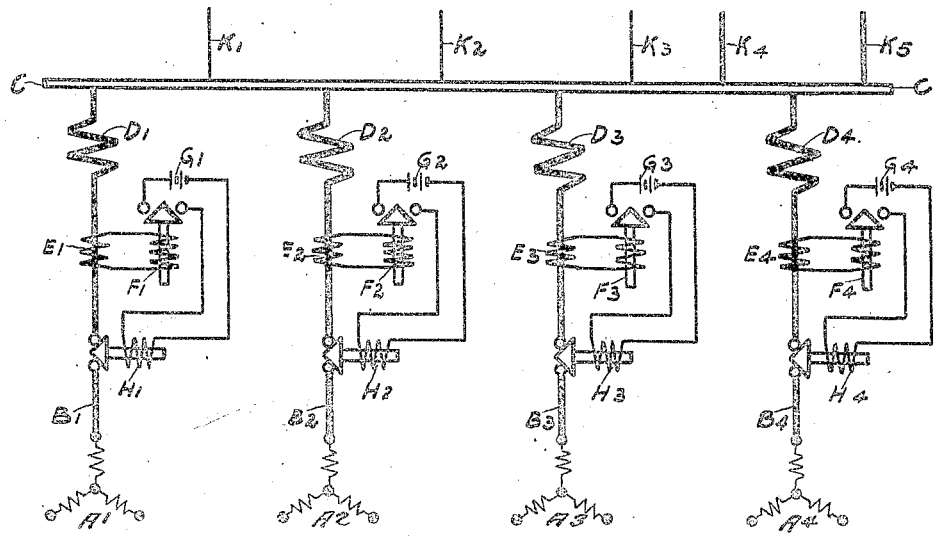
Figure 2:
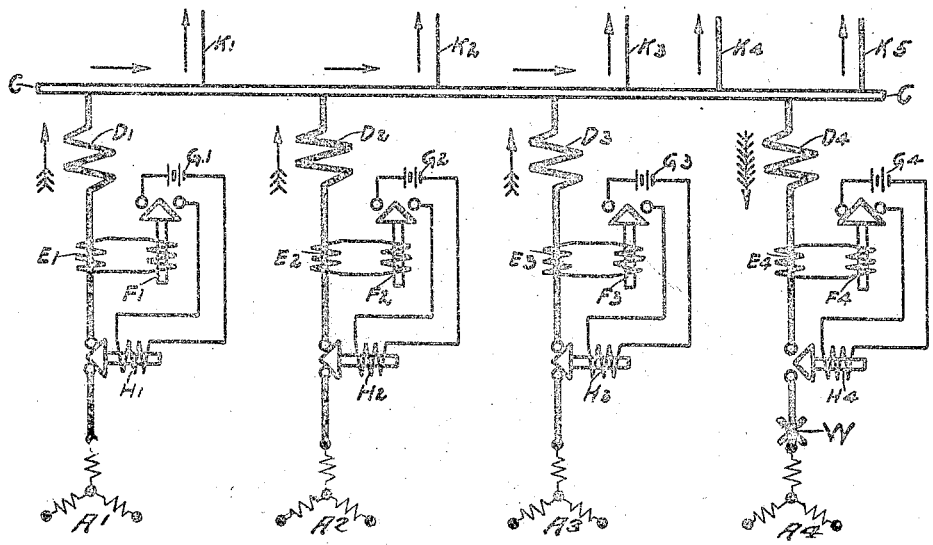

W. H. LAWRENCE & P. TORCHIO.
AUTOMATIC CIRCUIT BREAKER.
APPLICATION FILED FEB. 9, 1909.

940,881.

Patented Nov. 23, 1909.

WITNESS

INVENTORS

UNITED STATES PATENT OFFICE.

WILLIAM HENRY LAWRENCE AND PHILIP TORCHIO, OF NEW YORK, N. Y.

AUTOMATIC CIRCUIT-BREAKER.

940,881.        Specification of Letters Patent.        Patented Nov. 23, 1909.

Application filed February 9, 1909. Serial No. 476,874.

*To all whom it may concern:*

Be it known that we, WILLIAM HENRY LAWRENCE, a citizen of the United States, and PHILIP TORCHIO, a subject of the King of Italy, both residents of New York, in the county of New York and State of New York, have invented certain new and useful Improvements in Automatic Circuit-Breakers, of which the following is a specification.

This invention relates to the selective and automatic operation of circuit breakers on alternating current generators operated in parallel. When a group of two or more generator units are operating in parallel upon a common set of bus bars, if one of the units develops a defective insulation either in the machine itself or the leads connecting it to the bus bars, a short circuit may be formed between two points normally at difference of full generator potential. Under such conditions the current into the short circuit is furnished both from the defective generator itself and from the bus bars fed by the remaining units operating in parallel on the same buses. The latter amount of current is only limited by the impedance of the leads and windings of these generators. For the first instants of the short circuit the impedance of the windings of the generators is very many times less than their synchronous impedance as the Foucault currents in the iron of the machine tend to retard the magnetization of the iron and consequently retard the choking effect due to the counter electromotive force in the windings set up by the magnetic flux in the iron due to the overload current. Oscillogram tests have shown that for an instant a generator can supply into a short circuit more than 38 times its full rated current while a second or two later when the magnetic flux of the iron has had time to come into full play, the amount of current would be reduced to about 3 times full load. This feature has up to the present time made difficult or impractical the operation of automatic circuit breakers under the conditions of parallel operation of different generators the difficulty experienced being that the first rush of current from all the generators would trip all the automatic relays, thereby shutting the system down. For this reason the largest generating stations in this country are now operating their generators in multiple without automatic circuit breakers, relying on the operator to trip by hand the circuit breaker of a faulty generator; but often during this delay the system voltage becomes so lowered that the motors on the distributing lines fall out of step, blowing fuses and tripping overload circuit breakers on feeders and mains, thereby crippling or shutting down the entire system.

Our invention overcomes the disadvantages of an unprotected generating station by equipping each generator with a selective overload relay consisting of a reactance coil placed close to the bus bars on each of the generator leads, and a specially designed overload relay operating automatically the circuit breakers.

In the accompanying drawings, which are both electrical diagrams, Figure (1) shows the electrical connections of a generating station equipped with the selective overload relays and reactance coils under normal conditions of operation, and Fig. (2) illustrates, diagrammatically, the conditions of the same connections at the time of short circuit on one of the generators.

Similar letters refer to similar parts throughout the two diagrams.

The alternating current generators are represented by $A_1, A_2, A_3, A_4$ and while indicated as three phase they may, however, be of any number of phases. The single lines, $B_1, B_2, B_3, B_4$, represent the leads connecting one phase of the generators to the common set of bus bars C C. Similar connections for the other two phases are omitted for simplicity. The outgoing feeders are represented by $K_1, K_2, K_3, K_4, K_5$. In series with each generator lead are installed the reactance coils $D_1, D_2, D_3, D_4$ and the current transformers $E_1, E_2, E_3, E_4$, energizing the overload relays $F_1, F_2, F_3, F_4$ which close the circuit of any source of current $G_1, G_2, G_3, G_4$ controlling electrically the mechanism of the circuit breakers $H_1, H_2, H_3, H_4$. With this system of relays the circuit breakers can safely be operated automatically by having the reactance coils and overload relays designed and adjusted in accordance with the following description. The reactance is designed to limit the amount of short circuit current fed from the bus bars through this reactance to a definite amount dependent upon conditions, but for practical purposes approximately 15 times the full load current of the generator it protects. The combination of this external reactance with the generator reactance, will reduce the maximum current output from a sound generator into a short circuit on the bus bars or distributing feeders to an amount dependent upon the characteristics of the generator but in any case always considerably less than the 15 times full load current which is the amount that the reactance on the leads alone would carry under full voltage short circuit. In practice this amount will be less than 10 times full load current. This difference between the maximum possible inrush of current that can be sent from the bus bars into a short circuited generator and the maximum amount of current that a sound generator can send into the bus bars leaves a margin for the operation of an overload relay designed not to operate at all at any current that can flow in a sound generator circuit, but to operate on any current exceeding this limit. In the numerical instances cited the relay would not operate at any load under ten times rated load current of the generator but would operate at any load above 10 times up to 15 times rated load current if 15 is the value corresponding to the short circuit current of the reactance alone under full voltage.

Having thus described our invention, the operation is as follows: Under normal condition the generators $A_1$ $A_2$ $A_3$ $A_4$ will deliver their current through the leads $B_1$ $B_2$ $B_3$ $B_4$ to the bus bars C C, the flow of energy current being all in the direction of generator to bus bars C C and from bus bars to outgoing feeders $K_1$ $K_2$ $K_3$ $K_4$ $K_5$. When a phase short circuit develops on the windings or leads of a generator $A_4$ at the point marked W—Fig. (2) the flow of energy current of generators $A_1$ $A_2$ $A_3$ greatly increased in volume continues to flow to the bus bars C C as indicated by the arrows; from the bus bars a portion of this current will continue to feed the load of the outgoing feeders $K_1$ $K_2$ $K_3$ $K_4$ $K_5$—and the balance due to the increased volume will flow from the bus bars CC through the reactance $D_4$ and the leads $B_4$ into the short circuit W. If the reactance $D_4$ will allow to pass 15 times full load rating of a generator the current output of generators $A_1$ $A_2$ and $A_3$ will be the sum of this short circuit load plus the load on the outgoing feeders. If the latter is the full rated output of the four generators $A_1$ $A_2$ $A_3$ $A_4$, then the maximum output of the three generators $A_1$ $A_2$ $A_3$ at the instant generator $A_4$ is short circuited will be 19 times full load of one generator or $6\frac{1}{3}$ full load on each generator $A_1$ $A_2$ $A_3$. The 15 times full load current which passes through the reactance $D_4$ into the short circuit will operate the relay $F_4$ which will trip the circuit breaker $A_4$ thereby clearing the system. The overloads of $6\frac{1}{3}$ times full load on the generators $A_1$ $A_2$ $A_3$ would not be sufficient to operate the relays $F_1$ $F_2$ $F_3$ as these are set to operate only at above 10 times full load current, which is the selective feature of the invention.

What has been said of generators also applies to alternating transformers operated in multiple.

Having thus described the invention what is claimed as new and desired to be secured by Letters Patent is:

1. In combination with a multiplicity of alternating current generators operating in parallel and equipped with an external reactance coil on each generator lead, an overload relay on each lead calibrated to operate at a current in excess of the maximum instantaneous short circuit current of each generator and its external reactance coil in series.

2. In combination with a multiplicity of alternating current generators operating in parallel and equipped with an external reactance coil on each generator lead, an overload relay on each lead calibrated to operate at a current in excess of the maximum instantaneous short circuit current of each generator and its external reactance coil in series and arranged to control automatically a circuit breaker.

Signed at New York in the county of New York and State of New York this fifth day of February A. D. 1909.

WILLIAM HENRY LAWRENCE.
PHILIP TORCHIO.

Witnesses:
H. W. KNOTT,
A. R. THOMPSON.